UNITED STATES PATENT OFFICE.

PAUL THOMASCHEWSKI AND HEINRICH RAEDER, OF VOHWINKEL, AND WALTER MIEG AND PAUL FISCHER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

ANTHRACENE VAT DYE.

970,278.  Specification of Letters Patent.  Patented Sept. 13, 1910.

No Drawing.  Application filed February 12, 1910.  Serial No. 543,493.

*To all whom it may concern:*

Be it known that we, PAUL THOMASCHEWSKI and HEINRICH RAEDER, residing at Vohwinkel, and WALTER MIEG and PAUL FISCHER, residing at Elberfeld, Germany, citizens of the German Empire, have invented new and useful Improvements in New Dyes, of which the following is a specification.

Our present invention relates to the manufacture and production of new vat dyes of the anthracene seires dyeing cotton from the hydrosulfite vat beautiful fast shades. The process for their preparation consists in condensing aminobenzoylaminoanthraquinones with halogen substituted anthraquinones or by condensing halogen substituted benzoylaminoanthraquinones with aminoanthraquinones or aminobenzoylaminoanthraquinones with halogen-benzoylaminoanthraquinones.

The new products are after being dried and pulverized colored powders soluble in pyridin and quinolin with from a red to brown to green color and soluble in concentrated sulfuric acid with an olive to blue to green color. They yield on treatment with hydrosulfite and caustic soda lye vats suitable for dyeing cotton fast red to violet to brown to green to gray shades.

In carrying out the new process practically we can proceed as follows, the parts being by weight:—A mixture of 3 parts of monobenzoyl-1.4-diaminoanthraquinone (obtained by reducing 1-benzoylamino-4-nitroanthraquinone), 2 parts of beta-chloroanthraquinone, 0.1 part of CuCl$_2$, 3 parts of anhydrous sodium acetate and 30 parts of nitrobenzene is heated to boiling for about 6 hours. The resulting dye is precipitated from the melt with toluene. After cooling the dye is filtered off, washed with water and alcohol and dried. It is after being dried and pulverized a violet powder soluble in pyridin with a brownish-violet and soluble in concentrated sulfuric acid with a brownish-olive color. By treatment with reducing agents, e. g. hydrosulfite and NaOH an orange-brown vat is obtained which dyes cotton brownish-violet fast shades.

Herewith the properties of some of the new products are given: 1-benzoylamino-4-chloroanthraquinone + 1 - aminoanthraquinone dyes violet, 1-benzoylamino-5-amino-anthraquinone+1- or 2-chloroanthraquinone dyes red, a mixture of 1-benzoylamino-6-chloroanthraquinone and 1-benzoylamino-7-chloroanthraquinone + 1 - aminoanthraquinone dyes orange-red, 1-benzoylamino-4-chloroanthraquinone + 1.5 - diaminoanthraquinone dyes gray-violet, dibenzoyl-1.5-diamino-4-chloroanthraquinone+2-aminoanthraquinone dyes brown, monobenzoyl-1-4-diaminoanthraquinone + 1 - chloro-4-oxyanthraquinone dyes bluish-gray, dibenzoyl-1.5-diamino-4.8-diaminoanthraquinone +2-chloroanthraquinone dyes grayish-green, 1-benzoylamino-4-chloroanthraquinone+monobenzoyl - 1.4 - diaminoanthraquinone dyes bluish-gray, 1-benzoylamino-5-chloroanthraquinone + 1 - benzoylamino-4-aminoanthraquinone dyes brown. The same dyestuffs can be obtained by benzoylating the aminoanthrimids etc.

We claim:—

1. The herein described new vat dyestuffs of the anthracene series which are chemically benzoylamino-di- and tri-anthraquinonylamins, which dyestuffs are, after being dried and pulverized, colored powders soluble in pyridin and quinolin with from a red to brown to green color, soluble in concentrated sulfuric acid with from an olive to blue to green color; giving vats with hydrosulfite and caustic soda lye, which vats dye unmordanted cotton fast red to violet to brown to green to gray shades, substantially as described.

2. The herein described new vat dyestuff of the anthracene series which can be obtained by condensing 1-benzoylamino-4-aminoanthraquinone with 2-chloroanthraquinone, which dyestuff is, after being dried and pulverized, a violet powder, which is soluble in pyridin with a brownish-violet color; soluble in concentrated sulfuric acid with a brownish-olive color; giving an orange-brown vat with hydrosulfite and caustic soda lye, which vat dyes cotton brownish-violet shades, substantially as described.

In testimony whereof we have hereunto set out hands in the presence of two subscribing witnesses.

PAUL THOMASCHEWSKI. [L. S.]
HEINRICH RAEDER. [L. S.]
WALTER MIEG. [L. S.]
PAUL FISCHER. [L. S.]

Witnesses:
 OTTO KÖNIG,
 CHAS. J. WRIGHT.